United States Patent [19]

Bubeck et al.

[11] Patent Number: 4,521,569

[45] Date of Patent: Jun. 4, 1985

[54] IMPACT STYRENE POLYMER

[75] Inventors: Robert A. Bubeck; Charles B. Arends, both of Midland, Mich.

[73] Assignee: The Dow Chemical Company, Midland, Mich.

[21] Appl. No.: 562,922

[22] Filed: Dec. 19, 1983

Related U.S. Application Data

[63] Continuation of Ser. No. 497,942, May 25, 1983, abandoned, which is a continuation-in-part of Ser. No. 225,297, Jan. 15, 1981, abandoned, which is a continuation-in-part of Ser. No. 136,583, Apr. 1, 1980, abandoned, which is a continuation-in-part of Ser. No. 25,126, Mar. 29, 1979, abandoned.

[51] Int. Cl.$^3$ .............................................. C08K 5/01
[52] U.S. Cl. .................................... 525/316; 524/848
[58] Field of Search ................. 525/316; 524/474, 848

[56] References Cited

U.S. PATENT DOCUMENTS

| | | | |
|---|---|---|---|
| 3,819,764 | 6/1974 | Halasa | 260/880 R |
| 3,996,311 | 12/1976 | Westphal | 525/316 |
| 4,153,647 | 5/1979 | Glukhovskoi | 525/316 |

Primary Examiner—Paul R. Michl
Attorney, Agent, or Firm—R. B. Ingraham

[57] ABSTRACT

Impact styrene polymers, prepared in stratified polymerizers wherein one polymerizing zone is recirculated and a solvent is employed, can have improved environmental stress crack resistance when an aliphatic hydrocarbon is utilized as solvent rather than an aromatic or cycloaliphatic solvent.

3 Claims, 1 Drawing Figure

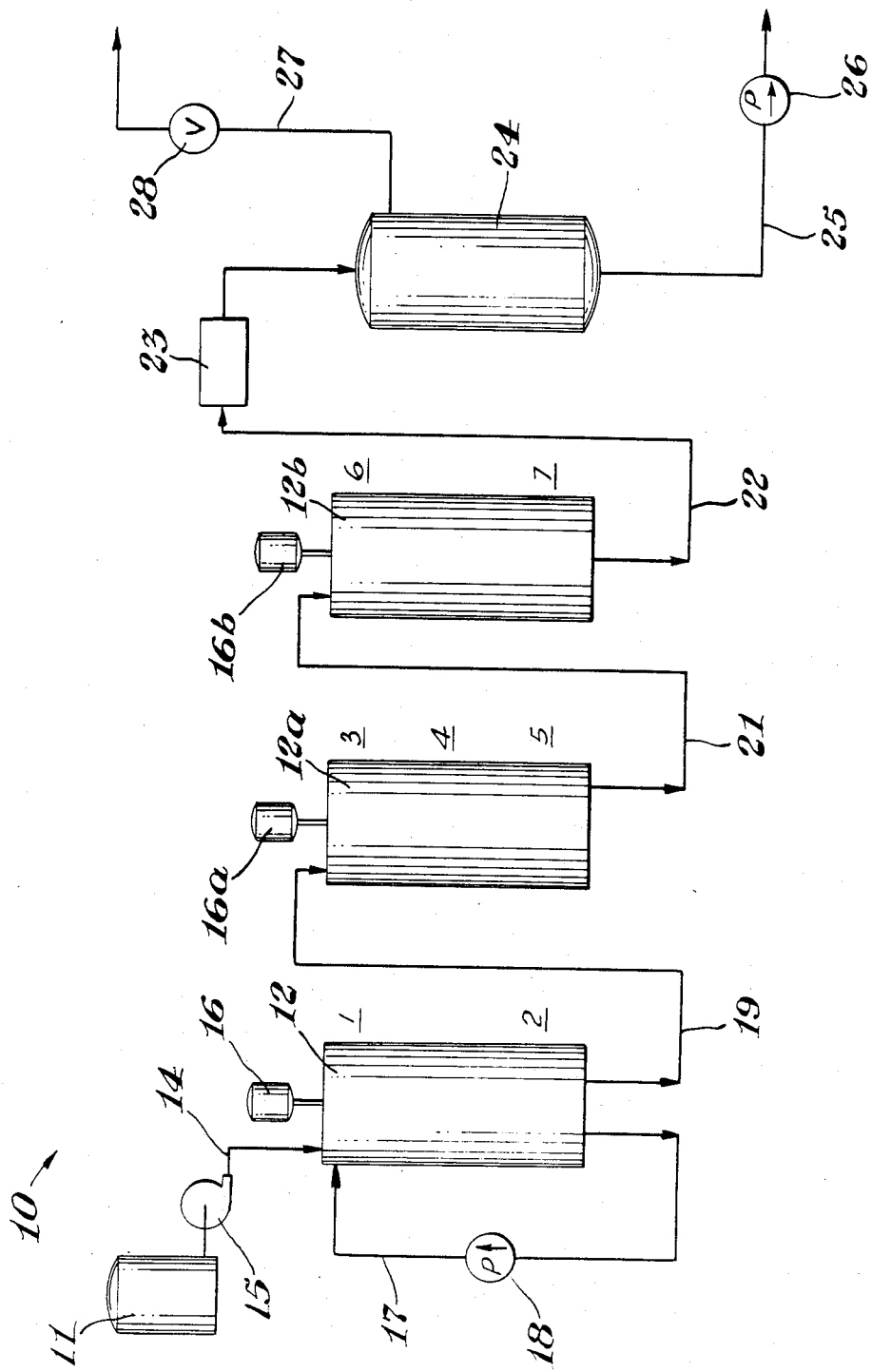

IMPACT STYRENE POLYMER

CROSS-REFERENCE TO RELATED APPLICATION

This is a continuation, of application Ser. No. 497,942, filed May 25, 1983, now abandoned, which is a continuation-in-part of the copending Ser. No. 225,297, filed Jan. 15, 1981, now abandoned, which is a continuation-in-part of Ser. No. 136,583, filed Apr. 1, 1980, now abandoned, which is a continuation-in-part of the copending Ser. No. 25,126, filed Mar. 29, 1979, now abandoned.

Impact resistant alkenyl aromatic resins such as polystyrene containing reinforcing rubber therein are highly desirable items of commerce and are used for many end use applications. Oftentimes such impact resistant styrene polymer is employed for housings, liners, molded articles, vacuum formed articles and the like which are exposed to oily contaminants. For example, a refrigerator liner may be vacuum formed from an impact resistant polystyrene and give excellent service until the surface of the liner has been contaminated with a material such as butter. In general, it is rather difficult to prevent the occasional contact of an oily foodstuff with a refrigerator liner when the refrigerator is used in the normal household manner. Impact polystyrene in general is easily and quickly formed into such liners and has satisfactory resistance to physical abuse. In some instances, refrigerator liners have been prepared from a two-layer sheet where the principal component of the sheet is impact polystyrene and a thinner surface layer of a polymer which is more resistant to oils and solvent is provided on the side which ultimately would be exposed to possible food or oil contamination.

It would be desirable if there were available an improved impact resistant styrene polymer.

It would be desirable if there were available an impact resistant styrene polymer having improved stress crack resistance.

It would also be desirable if there were an improved impact resistant styrene polymer which showed a reduced tendency toward cracking under stress when in the presence of an oily material.

These benefits and advantages in accordance with the present invention are achieved in a process for the preparation of an impact resistant alkenyl aromatic polymer wherein a stream is provided, the stream containing a polymerizing alkenyl aromatic monomer, a reinforcing rubber dissolved therein, initiating polymerization of the alkenyl aromatic monomer either thermally or by a free radical generating initiator in the presence of dissolved rubber to cause the rubber to form a plurality of rubber particles, therein subsequently polymerizing an additional amount of the alkenyl aromatic monomer to form alkenyl aromatic resinous polymer having a desired amount of rubber dispersed therethrough as a plurality of particles, and subsequently removing from the stream at least a major portion of the unreacted alkenyl aromatic monomer and organic solvent, the improvement which comprises employing as the solvent an aliphatic hydrocarbon composition which boils within the range of 95° C. to 170° C., to thereby provide a polymer with improved resistance to cracking under stress in the presence of oil.

By the term "alkenyl aromatic monomer" is meant an alkenyl aromatic compound having the general formula

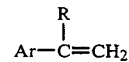

wherein Ar represents an aromatic hydrocarbon radical, or an aromatic hydrocarbon radical of the benzene series, and R is hydrogen or the methyl radical and containing up to 12 carbon atoms. Examples of such alkenyl aromatic monomers are styrene, α-methylstyrene, o-methylstyrene, m-methylstyrene, p-methylstyrene, ar-ethylstyrene, ar-vinylxylene, ar-chlorostyrene or ar-bromostyrene, and the like. Such polymerizations may be catalyzed or uncatalyzed and conducted under conventional temperatures and conditions and are readily controlled as to the particle size of the rubber in accordance with the present invention. Comonomers polymerizable with the alkenyl aromatic monomer and anhydride are methylmethacrylate, methylacrylate, ethylmethacrylate, ethylacrylate, acrylonitrile, methacrylonitrile acrylic acid and the like. Beneficially, such monomers are employed in a proportion of from about 1 to 40 weight percent of the polymer composition, and advantageously from about 20 to 35 weight percent of the polymer composition.

Suitable rubbers for the practice of the present invention are diene rubbers or mixtures of diene rubbers; i.e., any rubbery polymers (a polymer having a glass temperature not higher than 0° C., and preferably not higher than −20° C., as determined by ASTM Test D-746-52T) of one or more conjugated 1,3 dienes; e.g., butadiene, isoprene, piperylene, chloroprene, etc. Such rubbers include homopolymers, interpolymers and block copolymers of conjugated 1,3 dienes with up to an equal amount by weight of one or more copolymerizable monoethylenically unsaturated monomers, such as monovinylidene aromatic hydrocarbons (e.g., styrene; and aralkylstyrene, such as the o-, m- and p-methylstyrenes, 2,4-dimethylstyrene, the ar-ethylstyrenes, p-tertbutylstyrene, etc.; an α-alkylstyrene, such as α-methylstyrene, α-ethylstyrene, α-methyl-p-methylstyrene, etc.; vinyl naphthalene, etc.); ar-halo monovinylidene aromatic hydrocarbons (e.g., the o-, m- and p-chlorostyrenes, 2,4-di-bromostyrene, 2-methyl-4-chlorostyrene, etc.); acrylonitrile; methacrylonitrile; alkylacrylates (e.g., methylacrylate, butyl acrylate, 2-ethylhexyl acrylate, etc.); the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); α-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a cross-linking agent, based on the weight of the rubber forming monomer or monomers, cross-linking may present problems in dissolving the rubber in the monomers for the graft polymerization reaction, particularly for a mass or bulk polymerization reaction. In addition, excessive cross-linking can result in loss of the rubbery characteristics. The cross-linking agent can be any of the agents conventionally employed for cross-linking diene rubbers; e.g., divinylbenzene, diallyl malleate, diallyl fumarate, diallyl adipate, allyl acrylate, allyl methacrylate, diacrylates and dimethylacrylates of polyhydric alcohols; e.g., ethylene glycol dimethacrylate, etc.

A preferred group of rubbers are those consisting essentially of 65 to 100 percent by weight of butadiene and/or isoprene and up to 35 percent by weight of a monomer selected from the group consisting of alkenyl aromatic hydrocarbons (e.g., styrene) and unsaturated nitriles (e.g., acrylonitrile), or mixtures thereof. Particularly advantageous substrates are butadiene homopolymer or an interpolymer or A-B block copolymers of from 70 to 95 percent by weight butadiene and from 5 to 30 percent by weight of styrene.

The rubbers or rubbery reinforcing agents employed in the present invention must also meet the following requirements: an inherent viscosity from about 0.9 to 2.5 and preferably 0.9 to 1.7 grams per deciliter (as determined at 25° C. employing 0.3 grams of rubber per deciliter of toluene). Advantageously, the amount of such rubbery reinforcing agent can be from 5 to 35 weight percent of the final product, and beneficially from 10 to 25 percent and most advantageously from 15 to 25 percent.

Aromatic solvents are conventionally used in the preparation of impact resistant alkenyl aromatic polymers, however, suitable solvents for use in the practice of the present invention are aliphatic hydrocarbon solvents which are generally nonreactive in the polymerizing system and have a solubility parameter of from about 6.0 to 7.7 and beneficially the solubility parameter if from about 7.0 to 7.6. Such solvents boil within the range of 99° C. to 170° C. and are generally used in a quantity such that in the polymerizing stream the solvent is present at a level of from about 2 to 20 weight percent based on the total weight of the stream, and preferably from about 5 to 15 weight percent of the total weight of the stream. Such solvent may be a single compound or be a mixture of many compounds; for example, V.M. & P naphtha, white gasoline normal octane, and various C-6 to C-10 mixtures such as are sold under the trade designation of Isopar E and Isopar C by Exxon Corporation. Practical limitations in selecting a suitable aliphatic solvent are the vapor pressure it will generate in the polymerizing system, and the ease with which it can be removed during the devolitilization of the polymerizing stream. When 10 weight percent ethyl benzene is employed as a solvent in a stream containing 8.75 weight percent of rubber commercially designated as Diene 55 and 81.25 weight percent styrene, phase inversion occurs at about 22.4 percent solids. When the ethyl benzene is replaced with 10 weight percent of Isopar C, the phase inversion point is 24.8 percent. The resultant rubber particles obtained with Isopar C which has a solubility parameter of 7.1 show less occluded polystyrene than the particles obtained when ethyl benzene is employed as solvent. It is believed that as the amount of occluded polystyrene in the rubber particles is decreased for a fixed rubber content of the styrene polymer, resistance to cracking in the presence of oils or environmental stress crack resistance is improved.

Aliphatic organic solvents suitable for the practice of the present invention include the following compounds which are listed together with their boiling point in degrees centigrade at a pressure of 760 millimeters of mercury.

| | |
|---|---|
| n-Octane | 125.68 |
| n-Nonane | 150.82 |
| 2-Methylheptane | 117.65 |
| 3-Methylheptane | 118.93 |
| 4-Methylheptane | 117.71 |
| 3-Ethylhexane | 118.53 |
| 2,2-Dimethylhexane | 108.84 |
| 2,3-Dimethylhexane | 115.61 |
| 2,4-Dimethylhexane | 109.43 |
| 2,5 Dimethylhexane | 109.10 |
| 3,3-Dimethylhexane | 111.97 |
| 3,4-Dimethylhexane | 117.3 |
| 2-Methyl-3-ethylpentane | 115.65 |
| 3-Methyl-3-ethylpentane | 118.26 |
| 2,2,3-Trimethylpentane | 109.84 |
| 2,2,4-Trimethylpentane | 99.24 |
| 2,3,3-Trimethylpentane | 114.76 |
| 2,3,4-Trimethylpentane | 113.47 |
| 2,2,3,3-Trimethylpentane | 106.47 |
| 2-Methyloctane | 143.26 |
| 3-Methyloctane | 144.21 |
| 4-Methyloctane | 141.42 |
| 3-Ethylheptane | 143.0 |
| 4-Ethylheptane | 142.2 |
| 2,2-Dimethylheptane | 140.5 |
| 2,4-Dimethylheptane | 132.89 |
| 2,5-Dimethylheptane | 136.0 |
| 2,6-Dimethylheptane | 135.21 |
| 3,3-Dimethylheptane | 137.01 |
| 3,4-Dimethylheptane | 140.6 |
| 3,5-Dimethylheptane | 136.0 |
| 4,4-Dimethylheptane | 135.2 |
| 2-Methyl-3-ethylhexane | 138.0 |
| 2-Methyl-4-ethylhexane | 133.8 |
| 3-Methyl-3-ethylhexane | 140.6 |
| 3-Methyl-4-ethylhexane | 140.4 |
| 2,2,3-Trimethylhexane | 133.6 |
| 2,2,4-Trimethylhexane | 126.54 |
| 2,2,5-Trimethylhexane | 124.08 |
| 2,3,3-Trimethylhexane | 137.68 |
| 2,3,4-Trimethylhexane | 139.04 |
| 2,3,5-Trimethylhexane | 131.34 |
| 2,4,4-Trimethylhexane | 130.65 |
| 3,3,4-Trimethylhexane | 140.46 |
| 3,3-Diethylpentane | 146.17 |
| 2,2-Dimethyl-3-ethylpentane | 133.83 |
| 2,3-Dimethyl-3-ethylpentane | 144.7 |
| 2,4-Dimethyl-3-ethylpentane | 133.69 |
| 2,2,3,3-Trimethylpentane | 140.27 |
| 2,2,3,4-Trimethylpentane | 133.02 |
| 2,2,4,4-Trimethylpentane | 122.28 |
| 2,3,3,4-Trimethylpentane | 141.55 |
| 2-Methylnonane | 167.0 |
| 3-Methylnonane | 167.8 |
| 4-Methylnonane | 165.7 |
| 5-Methylonane | 165.1 |
| 3-Ethyloctane | 166.5 |
| 4-Ethyloctane | 163.64 |
| 2,2-Dimethyloctane | 156.9 |
| 2,3-Dimethyloctane | 164.31 |
| 2,4-Dimethyloctane | 155.9 |
| 2,5-Dimethyloctane | 158.5 |
| 2,6-Dimethyloctane | 158.54 |
| 2,7-Dimethyloctane | 159.87 |
| 3,3-Dimethyloctane | 161.2 |
| 3,4-Dimethyloctane | 163.4 |
| 3,5-Dimethyloctane | 159.4 |
| 3,6-Dimethyloctane | 160.8 |
| 4,4-Dimethyloctane | 157.5 |
| 2,5-Dimethyloctane | 162.13 |
| 4-N—Propylheptane | 157.5 |
| 4-Isopropylheptane | 158.9 |
| 3-Methyl-3-ethylheptane | 161.2 |
| 2-Methyl-4-ethylheptane | 156.2 |
| 2-Methyl-5-ethylheptane | 159.7 |
| 3-Methyl-3-ethylheptane | 163.8 |
| 3-Methyl-4-ethylheptane | 162.2 |
| 3-Methyl-5-ethylheptane | 158.2 |
| 4-Methyl-3-ethylheptane | 163.0 |
| 4-Methyl-4-ethylheptane | 160.8 |
| 2,2,3-Trimethylheptane | 157.6 |
| 2,2,4-Trimethylheptane | 148.3 |

| | |
|---|---|
| 2,2,5-Trimethylheptane | 150.8 |
| 2,2,6-Trimethylheptane | 148.93 |
| 2,3,3-Trimethylheptane | 160.2 |
| 2,3,4-Trimethylheptane | 159.9 |
| 2,3,5-Trimethylheptane | 160.7 |
| 2,3,6-Trimethylheptane | 156.0 |
| 2,4,4-Trimethylheptane | 151.0 |
| 2,4,5-Trimethylheptane | 156.5 |
| 2,4,6-Trimethylheptane | 147.6 |
| 2,5,5-Trimethylheptane | 152.8 |
| 3,3,4-Trimethylheptane | 161.9 |
| 3,3,5-Trimethylheptane | 155.68 |
| 3,4,4-Trimethylheptane | 161.1 |
| 3,4,5-Trimethylheptane | 162.5 |
| 2-Methyl-3-Isopropylhexane | 166.7 |
| 3,3-Diethylhexane | 166.3 |
| 3,4-Diethylhexane | 163.9 |
| 2,2-Dimethyl-3-ethylhexane | 156.1 |
| 2,3-Dimethyl-4-ethylhexane | 147.0 |
| 2,3-Dimethyl-3-ethylhexane | 163.7 |
| 2,3-Dimethyl-4-ethylhexane | 160.9 |
| 2,4-Dimethyl-3-ethylhexane | 160.1 |
| 2,4-Dimethyl-4-ethylhexane | 161.1 |
| 2,5-Dimethyl-3-ethylhexane | 154.1 |
| 3,3-Dimethyl-4-ethylhexane | 162.9 |
| 3,4-dimethyl-3-ethylhexane | 162.1 |
| 2,2,3,3-Tetramethylhexane | 160.31 |
| 2,2,3,3-Tetramethylhexane | 158.8 |
| 2,2,3,5-Tetramethylhexane | 148.4 |
| 2,2,4,4-Tetramethylhexane | 153.8 |
| 2,2,4,5-Tetramethylhexane | 147.88 |
| 2,2,5,5-Tetramethylhexane | 137.46 |
| 2,3,3,4-Tetramethylhexane | 163.59 |
| 2,3,3,5-Tetramethylhexane | 153.1 |
| 2,3,4,4-Tetramethylhexane | 161.6 |
| 2,3,4,5-Tetramethylhexane | 156.2 |
| 3,3,4,4-Tetramethylhexane | 170.0 |
| 2,4-Dimethyl-3-isopropylpentane | 157.04 |
| 2-Methyl-3,3-diethylpentane | 169.7 |
| 2,2,3-Trimethyl-3-ethylpentane | 169.5 |
| 2,2,4-Trimethyl-3-ethylpentane | 155.3 |
| 2,3,4-Trimethyl-3-ethylpentane | 169.44 |
| 2,2,3,3,4-Pentamethylpentane | 166.05 |
| 2,2,3,4,4-Pentamethylpentane | 159.21 |

Polymerization of the polymerizable mixture may be accomplished by thermal polymerization generally between temperatures of 60° C. to 170° and preferably from 70° to 140° C., or alternately any free radical generating catalyst or initiator may be used in the practice of the invention, including actinic radiation. It is preferable to incorporate a suitable catalyst system for polymerizing the monomer, such as the conventional monomer-soluble peroxy and perzao compounds. Exemplary catalysts are di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide, isopropyl carbonate, 2,5-dimethyl-2,5-di(tert-butylperoxy)hexane, 2,5-dimethyl-2,5 di(tert-butylperoxy)hexyne-3, terty-butyl hydroperoxide, cumene hydroperoxide, p-methane hydroperoxide, cyclopentane hydroperoxide, diisopropylbenzene hydroperoxide, p-tert-butyl-cumene hydroperoxide pinane hydroperoxide, 2,5-dimethylhexane-2,5-dihydroperoxide, 2,2'-azobisisobutyronitrile, etc., and mixtures thereof.

The catalyst is generally included within the range of 0.001 to 1.0 percent by weight, and preferably on the order of 0.005 to 0.5 percent by weight of the polymerizable material depending upon the monomers and the desired polymerization cycle.

If desired, small amounts of antioxidants are included in the feed stream, such as alkylated phenols, e.g., 2,6-di-tert-butyl-p-cresol, phosphites such as trinonyl phenyl phosphite and mixtures containing tri (mono and dinonyl phenyl) phosphites. Such materials in general may be added at any stage during polymerization.

Plastifiers or lubricants such as butyl stearate, polyethylene glycol, polybutenes and mineral oil may also be added if desired. Polymers prepared in accordance with the present invention are well suited for extrusion into sheet or film. Such sheet is beneficially employed and thermally formed into containers, packages, refrigerator liners, housings and the like. Alternatively the polymer is employed with benefit of injection molding of a wide variety of components such as containers, ducts, racks and the like.

The figure schematically depicts apparatus suitable for continuing polymerization in accordance with the present invention. In the Figure there is an apparatus generally designated by the numeral 10. The apparatus 10 comprises in cooperative combination a feed tank 11 connected to a first reactor 12 of a line or conduit 14 having a metering pump 15 therein. The reactor 12 has an agitator not shown driven by a motor 16. The reactor 12 has an upper end adjacent motor 16 and a lower end remote from motor 16, a recirculation line or conduit 17 having a pump 18 therein is connected between the upper end and lower end of the reactor 12. A line or conduit 19 is connected to the lower end of reactor 12 and to an upper end of a generally like reactor 12A. Reactor 12A has an agitator, not shown, driven by a motor 16A. The lower end of reactor 12A is connected by means of line 21 to an upper end of a third reactor 12B, the reactor 12B which has an agitator is driven by motor 16B. A discharge line 22 is connected to the bottom of reactor 12B and with a heat exchanger 23. The heat exchanger 23B discharges to a devolatizer or chamber 24, the devolatizer has a lower outlet line 25 having a pump 26 therein and an overhead discharge line 27 having pump 28 therein. Flow direction polymerization apparatus is indicated by the arrowheads. The numerals 1 through 7 indicate individual temperature control zones thereof. The first reactor 12 has two temperature control zones thereof. The first reactor 12 has two temperature control zones 1 and 2, the second reactor has 3 and the third reactor two zones.

In operation of the apparatus for the practice of the method of the present invention, the polymerizable monomer, for example styrene, a desired quantity of reinforcing rubber diluent, the free radical initiator, and other optional additives are added to the feed tank 11 to provide a homogeneous solution. The feed pump 15 forwards the feed material tank 11 into the upper portion of the reactor 12 to fill the reactor 12. The pump 18 removes material from the bottom of the reactor 12 and returns it to the top of the reactor 12, making the reactor 12 a back-mixed reactor. The effluent from the reactor 12 passes through the line 19 into the reactor 12A in which generally plug flow is maintained. The effluent from the reactor 12A passes to the reactor 12B which is also of plug flow variety. Effluent from the reactor 12B passes through the line 22 into a heat exchanger 23 where the polymerizing stream is heated to devolatilizing temperature and the stream discharges into devolatilizing chamber 24. The pump 28 is a vacuum pump which carries away all or almost all of the volatile materials remaining in the stream. Molten polymer is discharged therethrough the line 25 and the pump 26. In practice of the method of the present invention employing apparatus such as illustrated in the figure, generally it is desirable to maintain a solids level of from about 20 to 40 percent in the first or recirculated reactor. Discharge from the second reactor is from about 40 to 55 percent, and the discharge into the heat exchanger 23 being at a level of from about 60 to 95 percent solids. In the first reactor a relatively high rate of agitation is maintained. The second reactor is operating at about one-half the shear rate of the first reactor and minimum agitation employed in the third reactor. The method of the invention can also be readily practiced batch wise wherein a partial addition of the feed mixture is added with agitation at about the rate of the alkenyl aromatic monomer polymerization. The rate of addition of the polymerizable feed mixture containing rubber and the desired solvent should be such that only gradual phase inversion occurs; that is, separation of the rubber particles in the polymerizing mass. It is desirable that after the addition of all of the feed mixture to the reactor, the solids be from about 25 to 35 percent.

The invention is further illustrated but not limited by the following examples:

EXAMPLE 1

A plurality of impact resistant polystyrenes were prepared employing various solvents. The feed consisted of 7.2 parts by weight of a polybutydiene rubber, sold under the trade designation of Diene-55, 63.2 parts styrene and 9.6 parts by weight of solvent. An apparatus generally as depicted in the figure was employed for the polymerization. The reactors each were elongated cylinders having a bar agitator extending almost full length; each of the cylindrical reactors had a volume of 72 cubic inches. About 75 weight percent of the feed was introduced through the equivalent of line 14 and the remainder introduced into the equivalent of zone 4 of reactor 12a. Effluent from the first stage was 35 weight percent solids and the agitator of the first stage rotated at about 110 revolutions per minute. Effluent from the second stage was about 45 weight percent solids and the second stage agitator corresponding to the motor 16a rotated at about 65 revolutions per minute.

All parts are parts by weight unless otherwise specified.

The agitator in the third vessel corresponding to the vessel 10B rotated at 4 revolutions per minute, and the effluent entering line 22 was 70 percent solids. Temperatures in zones 1 through 7 were about 102°, 117°, 119°, 118°, 124°, 133°, 153° C., respectively. The pump 18 provided a recirculation rate of about 225 percent per hour based on the volume of reactor 12. The feed mixture was fed at a rate of about 550 grams per hour. The heat exchanger raised the temperature of the stream being processed to about 246° C. and the polymer stream was discharged into the devolatilizer 24 as a strand and the pressure within the devolatilizer was about 23 mm of mercury absolute. In each polymerization, it was attempted to obtain a rubber particle size as determined by phase contrast microscopy of between about 2 and 5 microns and a rubber level of about 10 percent. The polymer was cooled, pelletized and subsequently molded into test specimens. The weight average molecular weight of the polymers was determined by gel permeation chromatography. Particle size was determined by phase contrast microscopy. The environmental stress crack resistance was determined by coating a molded specimen with a 1 to 1 by weight mixture of cottonseed oil and oleic acid thickened with about 20 weight percent fumed silica based on the weight of oil plus acid. The test specimens were stressed to 1,000 pounds per square inch and the approximate time of breaking recorded. The results are set forth in the Table I.

TABLE I

| Sample | $M_w$ | Particle Size | Diluent[2] | Solubility Parameter | ESCR* @ 1000 PSI |
|---|---|---|---|---|---|
| Set A: | | | | | |
| 1. | 200,000 | 4.9μ | Ethyl benzene | 8.8 | 20,000 sec |
| 2. | 220,000 | 3.8μ | n-Octane | 7.55 | 80,000 sec |
| 3. | 204,000 | 2.4μ | Isopar E | 7.1 | 60,000 sec |
| 4.[1] | 203,000 | 1.9μ | Isopar C | 7.1 | 40,000 sec |
| Set B: | | | | | |
| 5. | 284,000 | 2.0μ | Ethyl benzene | 8.8 | 50,000 sec |
| 6. | 293,000 | 1.7μ | VM&P Naphtha[3] | 7.3 | 90,000 sec |

*ESCR = Environmental Stress Crack Resistance
[1]ESCR improvement of sample no. 4 is not maximized due to small gel particle size compared to sample no. 1.
[2]ESCR improvement (by fracture time) is from 2 to 4 times depending on linear aliphatic solvent compared to ethyl benzene
[3]Boiling range 118° C., to 139° C., 10% aromatic content, Western Eaton Solvents. Footnote following Table I: Isopar-C is an isoparaffinic hydrocarbon fraction with a narrow boiling range of about 97° to 105° C.; Aromatics, Vol. % 0.02; Saturates, Wt. % 2,3-dimethylpentane 3.5; 3-methylhexane 0.5; 2,2,4-trimethylpentane 84.4; 2,2,3-trimethylpentane 2.2; 2,3,4-trimethylpentane 1.6; 2,3,4-trimethylpentane 1.6; 2,3,3-trimethylpentane 1.0; 2,2,3-trimethylbutane 2.3; methylcyclopentane 0.1; 2-methylhexane 0.6; 2-methylheptane 2.2.; 4-methylheptane 1.6; total sulfur 1ppm; peroxides 0 ppm; chlorides 1 ppm. Isopar-E is an isoparaffinic fraction having a boiling range of about 115° to 142° C.

In a manner similar to the foregoing example, other resins of improved environmental stress crack resistance may be prepared employing principally aliphatic solvents as hereinbefore described boiling at a temperature from about 95° C. to about 170° C. All boiling points are determined at an absolute pressure of 760 millimeters of mercury, and the boiling ranges are determined in accordance with American Society for Testing Materials, determination ASTM-D86.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a process for the preparation of an impact resistant alkenyl aromatic polymer wherein a stream is provided, the stream containing a polymerizing alkenyl aromatic monomer, a reinforcing rubber dissolved therein, initiating polymerization of the alkenyl aromatic monomer either thermally or by a free radical generating initiator in the presence of dissolved rubber to cause the rubber to form a plurality of rubber particles, therein subsequently polymerizing an additional amount of the alkenyl aromatic monomer to form alkenyl aromatic resinous polymer having a desired amount of rubber dispersed therethrough as a plurality of particles, and subsequently removing from the stream at least a major portion of the unreacted alkenyl aromatic monomer and organic solvent, the improvement which comprises employing as the solvent from about 2 to about 20 weight percent based on the total weight of the stream, an aliphatic hydrocarbon composition having a solubility parameter from about 6 to about 7.7 and boiling within the range of 99° C. to 170° C., to thereby provide a polymer with improved resistance to cracking under stress in the presence of oil.

2. The process of claim 1 wherein the aliphatic aromatic monomer is styrene.

3. The process of claim 1 wherein the solubility parameter is from about 7.0 to 7.7.

* * * * *